RAYMOND B. TASKER
INVENTOR.

BY Lyon & Lyon
ATTORNEYS

Dec. 22, 1953

R. B. TASKER 2,663,868

SWEEP LIMITER IN RADAR INDICATING SYSTEM

Filed Feb. 21, 1951

RAYMOND B. TASKER
INVENTOR.

BY

*Lyon & Lyon*

ATTORNEYS

Dec. 22, 1953  R. B. TASKER  2,663,868
SWEEP LIMITER IN RADAR INDICATING SYSTEM
Filed Feb. 21, 1951  8 Sheets-Sheet 3

RAYMOND B. TASKER
INVENTOR.

BY Lyon & Lyon
ATTORNEYS

RAYMOND B. TASKER
INVENTOR.

BY Lyon & Lyon
ATTORNEYS

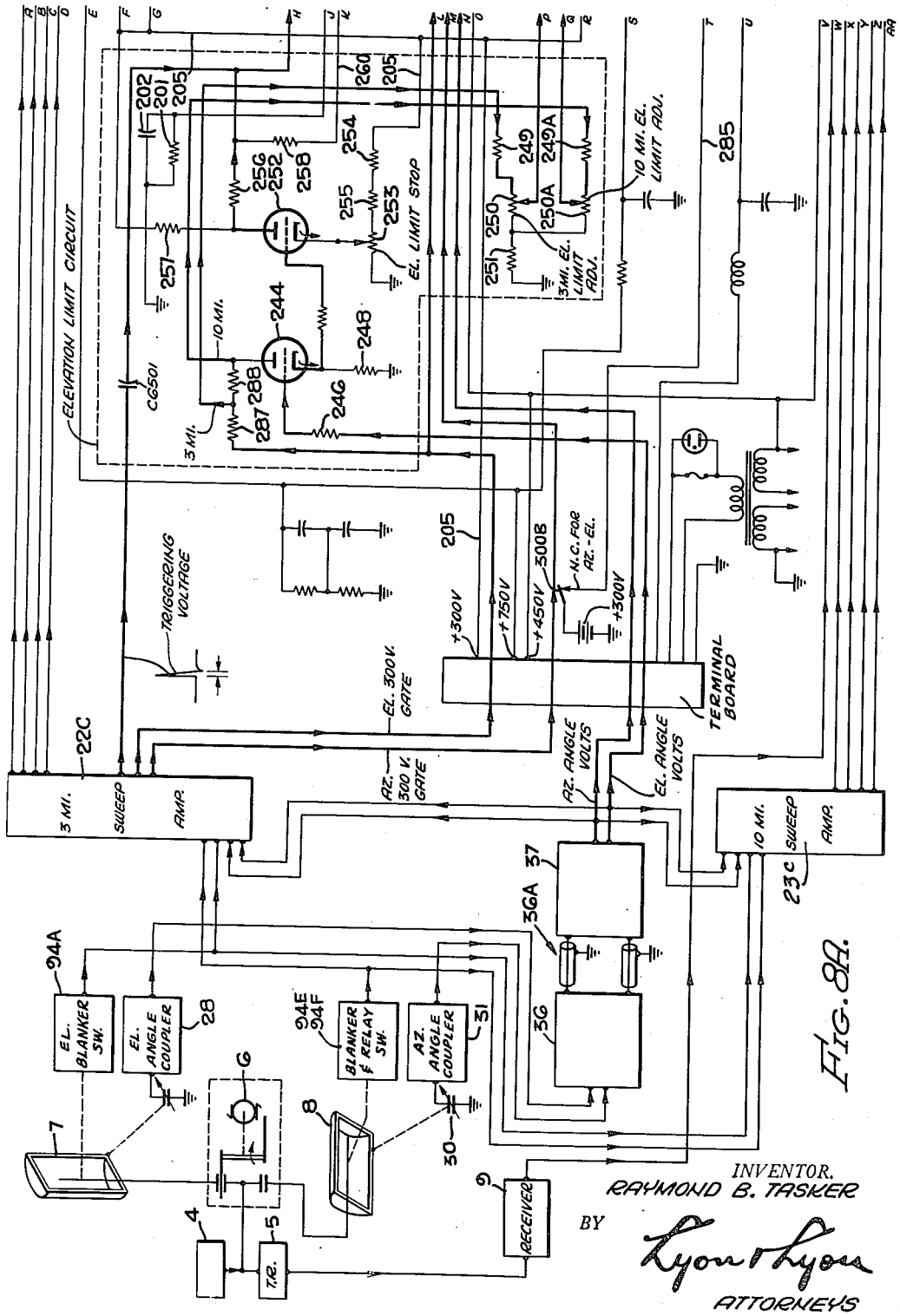

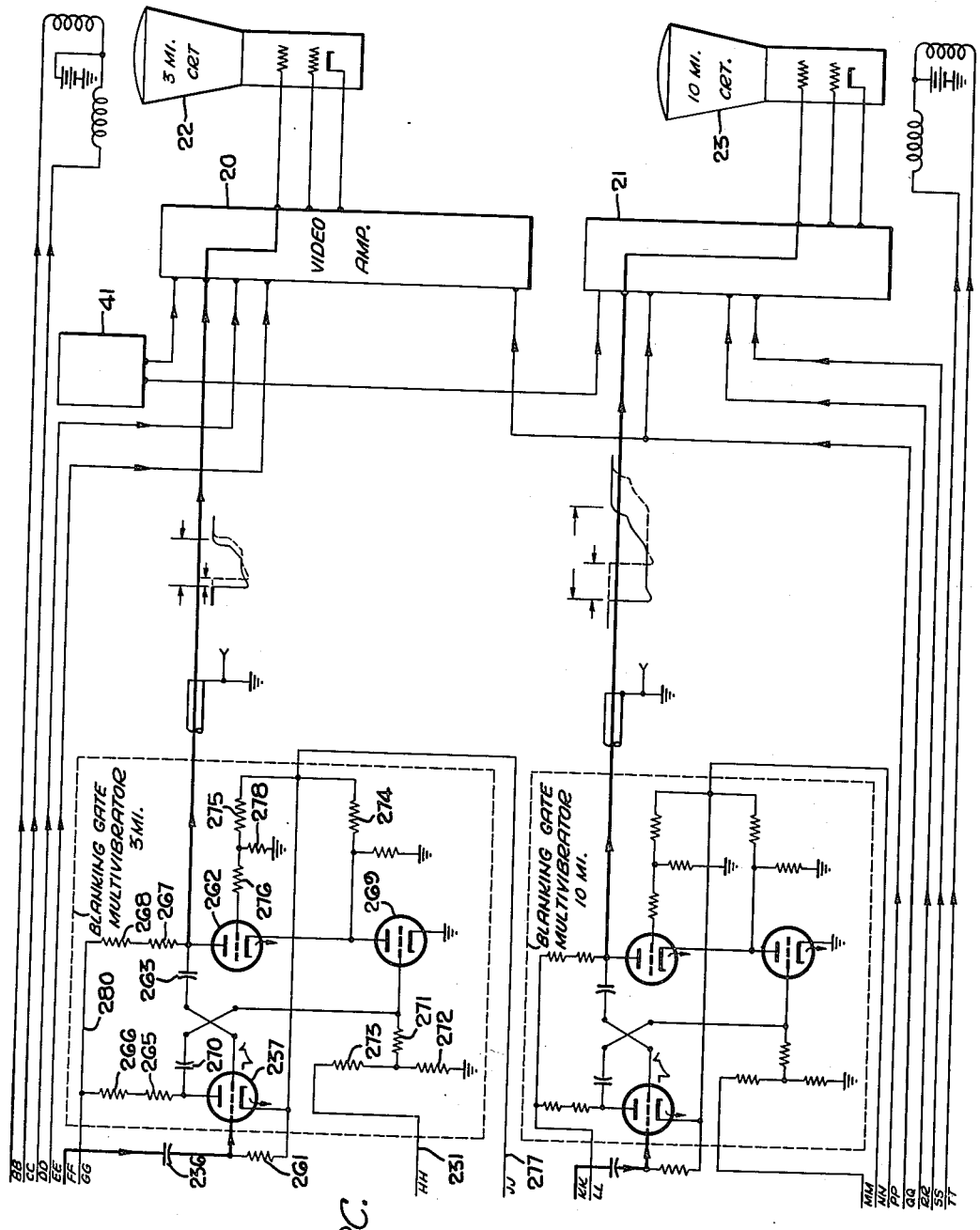

Dec. 22, 1953  R. B. TASKER  2,663,868
SWEEP LIMITER IN RADAR INDICATING SYSTEM
Filed Feb. 21, 1951  8 Sheets-Sheet 7

INVENTOR.
RAYMOND B. TASKER
BY Lyon & Lyon
ATTORNEYS

Dec. 22, 1953  R. B. TASKER  2,663,868
SWEEP LIMITER IN RADAR INDICATING SYSTEM
Filed Feb. 21, 1951  8 Sheets-Sheet 8

RAYMOND B. TASKER
INVENTOR.

BY Lyon Lyon
ATTORNEYS

Patented Dec. 22, 1953

2,663,868

UNITED STATES PATENT OFFICE 2,663,868

SWEEP LIMITER IN RADAR INDICATING SYSTEM

Raymond B. Tasker, Sepulveda, Calif., assignor to Gilfillan Bros., Inc., Los Angeles, Calif., a corporation of California Application February 21, 1951, Serial No. 212,163

10 Claims. (Cl. 343—11)

The present invention relates to improved circuitry for producing two separate and distinct two-dimensional representations, displays or pictures on the screen of a single cathode ray tube, and in general relates to improvements in the cathode ray tube indication system useful in ground controlled approach (G. C. A.) aircraft landing systems of the type shown and claimed in the copending application of Homer G. Tasker et al., Serial No. 776,702, filed September 29, 1947, for "Single Scope Two Coordinate Radar System."

In general, an object of the present invention is to provide an improved sweep limiter circuit for use in shaping and/or clipping the pattern of cathode ray tube displays, and in particular to shaping and/or clipping the two separate and distinct two-dimensional representations employed heretofore in ground controlled approach (G. C. A.) radar equipment.

In systems of this type it is desired to provide flexible, compact, light and inexpensive equipment for purposes of shaping and clipping the multiple pattern display from which an observer may accurately locate the position of an aircraft in space and with respect to a predetermined approach glide path and fixed obstacles. This information is readily ascertained in that the two distinct representations, i. e., one showing the position of the aircraft as a function of its elevation and range, and the other showing the position of the aircraft as a function of its azimuth and range, are correlated in that one of the representations lies directly above the other, with the range in each pattern being on the same scale and represented by the same horizontal distance in each pattern, as indicated in Figure 2.

An object of the present invention is to provide improved circuitry whereby the aforementioned results may be obtained with a relatively small number of component parts, such as vacuum tubes.

Another object of the present invention is to provide an improved indicating system of this character in which the functions of two multivibrator stages in prior art systems of this character are now produced by a single multivibrator stage, thus resulting in simplification and elimination of circuit components.

Another object of the present invention is to provide an improved system of this character in which the blanking or clipping, as it appears on the cathode ray tube, is cleaner and sharper and approaches the idealized condition.

Another object of the present invention is to provide improved circuitry of this character which is capable of presenting a cathode ray tube representation with the so-called elevation versus range, i. e., El portion of the representation, completely blanked out, and the azimuth versus range, i. e., Az portion, unlimited, to thereby allow an observer to see an approaching aircraft earlier as it flies into the approach zone.

Another object of the present invention is to provide improved circuitry of this character which features the use of a blocking oscillator as an isolation stage between the source of triggering voltage and the pattern limiting circuit.

In prior art systems of this character which used both an azimuth multivibrator and an elevation multivibrator, the region on the display in the vicinity of sweeps corresponding to zero degrees was not clearly defined, perhaps due to sporadic operation of these multivibrators in this transition zone where limiting was intended to be stopped. By effectively substituting the two multivibrators heretofore required by a single multivibrator, sharper definition is obtained in the representation in this region. It is therefore another object of the present invention to provide improved circuitry whereby this desirable result may be obtained.

Another object of the present invention is to provide improved circuitry of this type characterized by its flexibility whereby the representations produced may be adjusted, altered or "tailored" to special configurations for unusual airport requirements. For example, in some instances, instead of having the usual preferred straight line approach path, obstacles to flight of aircraft such as hills, mountains or the like may necessitate a curved or a "dog leg" type of glide path, and in such instances positions represented by different points on the representation should be accurately correlated with the particular glide path.

In general, the present invention contemplates an improved cathode ray tube indicating system in radar installations of the type in which two separate and distinct two-dimensional representations, displays or pictures are presented effectively simultaneously on the screen of a single cathode ray tube, each of such representations being produced by sweeping a single cathode ray beam outwardly from different electrical centers. This is accomplished, using time sharing, by presenting one of the displays with a first electrical center upon one portion of the screen, switching to a second electrical center and presenting the second display upon a second portion of the screen, and repeating further this procedure as a continuous cycle. By appropriate selection of the persistence time of the fluorescent screen of the cathode ray tube in accordance with the frequency of this cycle, both displays are made visible practically continuously, and hence may be viewed simultaneously.

Although the system is here described and shown as providing for two separate displays, it will be understood that certain aspects of the present invention may be applied equally well to the showing of one or more than two displays on one tube.

These broad general purposes are accomplished with the help of means which perform three more or less distinct functions, enumerated presently.

Firstly, after the presentation of one display is completed and before the presentation of the next is begun, the "zero," origin position or electrical center of the cathode ray beam is shifted on the screen by a controllable selected amount. This displaces one complete display relative to the other, so that the two displays do not overlap; or, so that they overlap in a manner and to an extent which can be controlled. Secondly, and during the same time interval, the circuits which control both the intensity of the cathode ray beam and its position with respect to its "zero" position are switched from control by input impulses or sweep currents associated with one display to control by impulses or sweep currents associated with the other display. Thus the primary control circuits by which each display is reproduced need not be basically different from the circuits by which such a display would normally be reproduced alone on a cathode ray tube. However, the circuits are modified in various respects, one type of modification being the provision just referred to for switching control from one set of input signals or sweep currents to the other. And thirdly, in accordance with important features of the present invention, novel means are provided for limiting the screen area occupied by each of the displays, by cutting off certain selected non-essential portions of them. This procedure, which we here call "sweep limiting" or "pattern clipping," or merely "limiting" or "clipping," permits the two pictures to be so altered or "tailored" in shape that they can be fitted together more closely on the screen, while still avoiding any interference or overlapping between them, and without distortion of those portions which are preserved.

By this expedient, complete information furnished by the two radar systems, i. e., one scanning the aircraft approach zone in azimuth and the other in elevation, may be presented on the screen of a single cathode ray tube. With the two representations in close juxtaposition they can be read accurately and virtually simultaneously by a single operator, who is then able to communicate rapidly the necessary information to the pilot of the aircraft, the image of which appears on both representations in relationship to predetermined "glide paths" or lines maintained on the screen by mechanical means.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 8B:
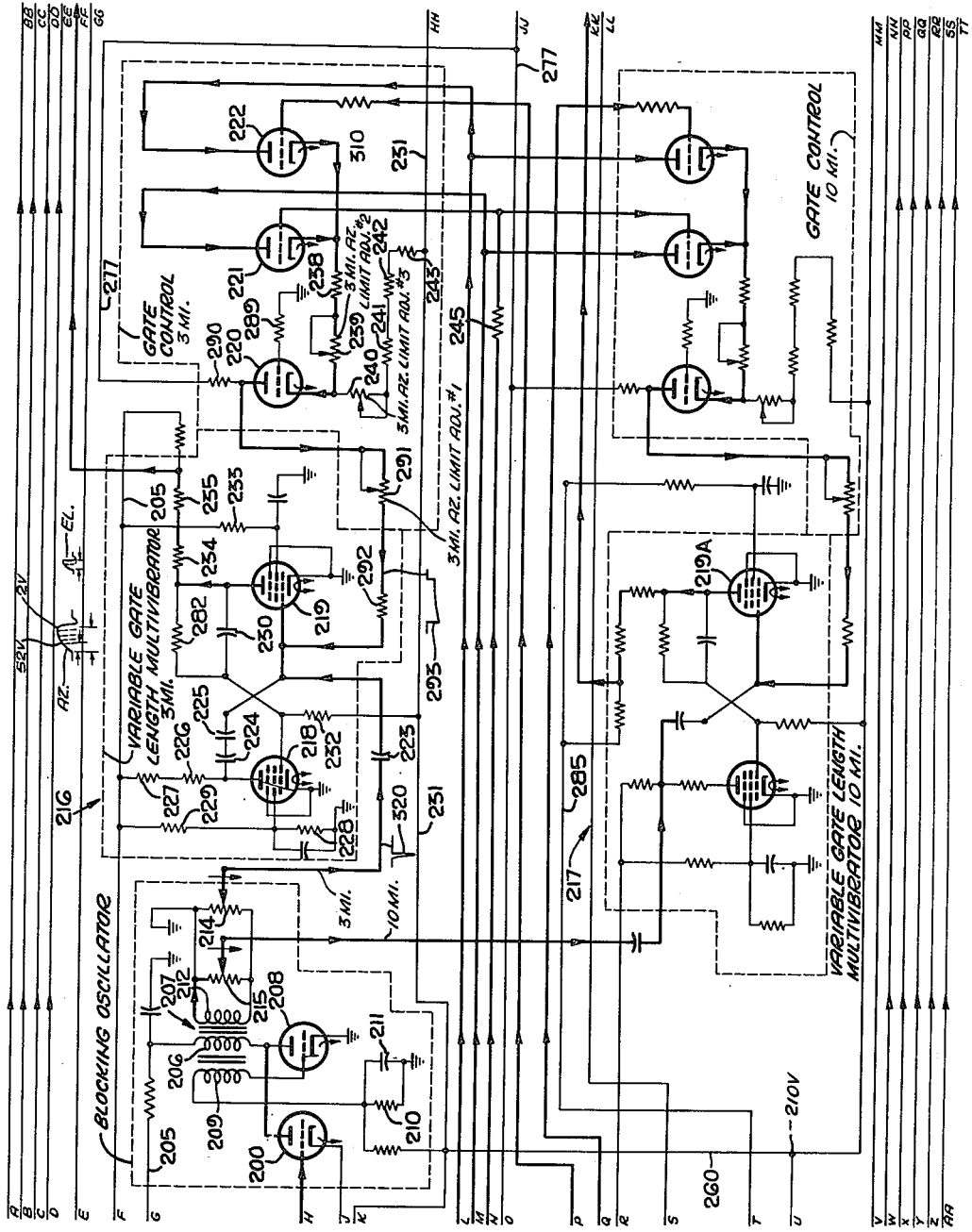

Figure 8 includes Figures 8A, 8B and 8C, each of which are shown on different drawing sheets, and it is intended that terminals having the same letters in these three figures be connected together for purposes of realizing Figure 8. Figure 8 when thus completed corresponds substantially to Figure 1, but details of the sweep limiter 40 are clearly set forth in Figure 8.

Figure 9:
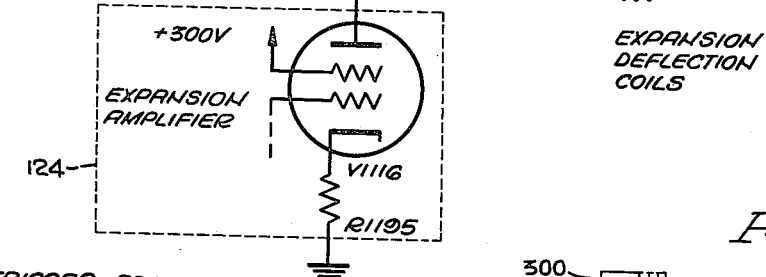
Figure 9:
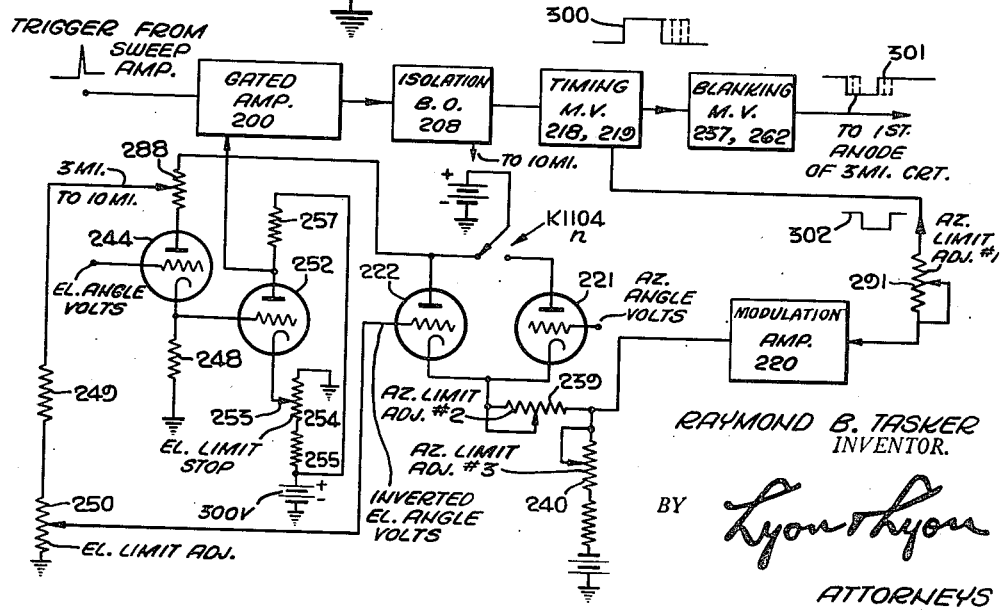

Figure 9 is a simplified schematic representation of portions of the sweep limiter circuit shown in Figure 8.

Figure 1:
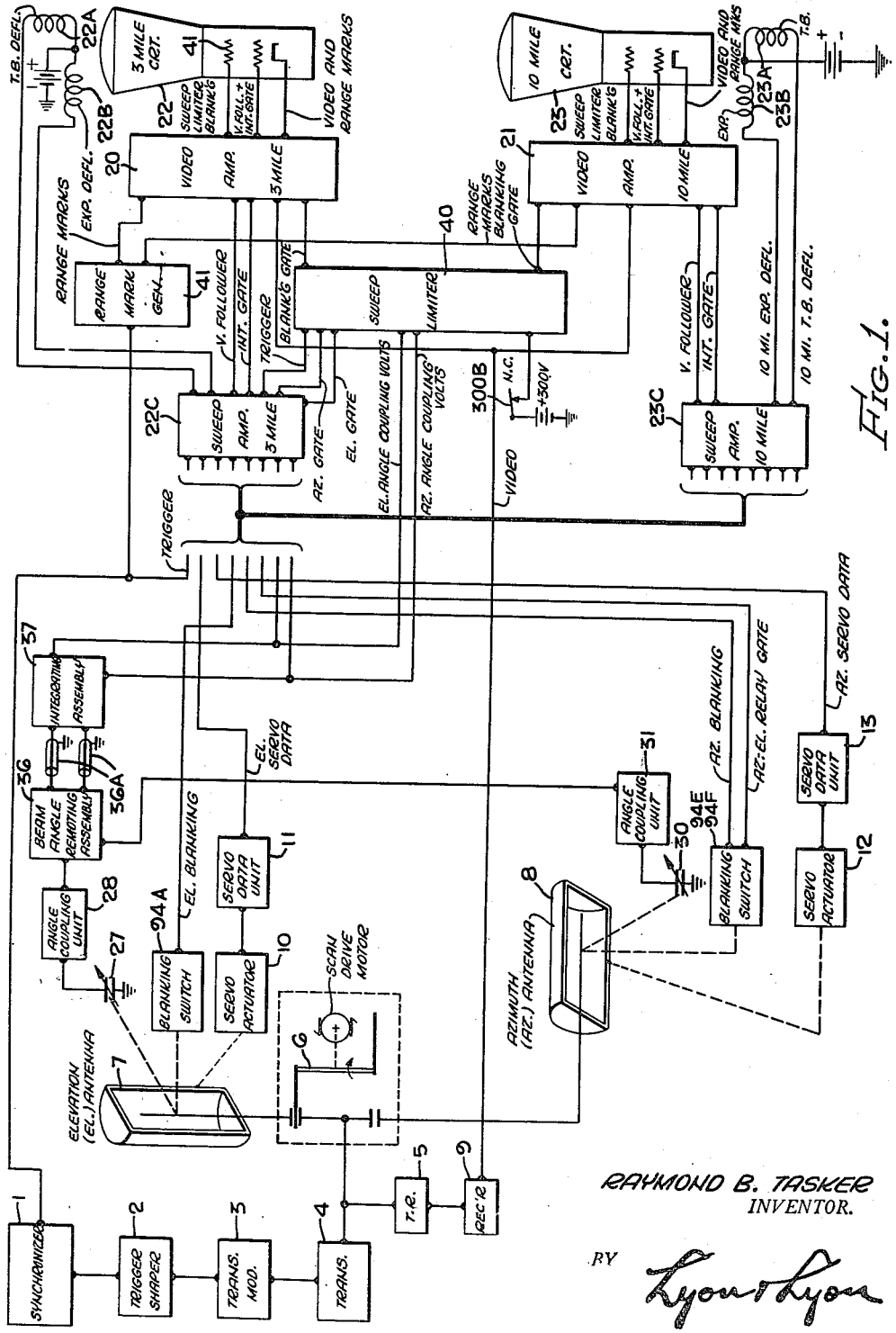
Figure 1 is a schematic representation of portions of a radar system embodying features of the present invention.

In Figure 1, the synchronizer 1 serves to generate timing pulses which are used to time the operation of the trigger shaper stage 2, the output of which is used to energize the transmitter modulator stage 3 which, in turn, causes the application of a pulse to the transmitter 4 to initiate its operation. This transmitter stage 4, thus pulsed at a constant repetition rate of, for example, 2,000 pulses per second, consists of, for example, a magnetron oscillator with a characteristic frequency of about 10,000 megacycles. The output of this transmitter stage 4 is transferred to either the elevation (El) antenna 7 or azimuth (Az) antenna 8, depending upon the position of the motor driven interrupter or radio frequency switch 6. The transmit-receive switch 5 (T. R. switch) prevents power from the transmitter 4 from being applied directly to the receiver 9. This transmit-receive switch 5, as is well known in the art, however, allows low intensity signals, such as the train of resulting echo signals received on the antennas 7, 8, to be transferred to the input terminals of the receiver 9. This diversion of energy from the transmitter 4 to the antennas 7, 8, accomplished by operation of switch 6, occurs at a rate of approximately two per second, so that in effect the combined antennas obtain four "looks" per second of the space scanned. In other words, the switch 6 is rotated twice per second, and while energy is being transmitted to one of the antennas 7, 8, the resulting electromagnetic beam projected into space is caused to scan such space. The means whereby such scanning movement of the projected electromagnetic beam is obtained may be of the type described in the copending application of Karl A. Allebach, Serial No. 49,910, filed September 18, 1948, now U. S. Patent 2,596,-113, granted May 13, 1952, for "Bridge Type Precision Antenna Structure," which depends for its operation on the use of a variable wave guide type of antenna. This particular means, per se, forms no part of the present invention and, so far as the aspects of the present invention are concerned, the antenna scanning beam may be produced by moving the entire antenna through a relatively small arc of a circle. Actually, in effect, the azimuth antenna beam scans first in one direction and then in the other, waiting after each scan while the elevation beam completes a scan in elevation.

In initial adjustment of the antennas 7, 8, the elevation antenna 7 is servoed into position by means of the servo actuator 10, and data of the servoed position of the elevation antenna 7 is transmitted by means of the servo data unit 11 to the rest of the system. Likewise, azimuth antenna 8 is servoed in azimuth position by means of servo actuator 12, and the position at which it is servoed is indicated to the rest of the system by data transmitted by the servo data unit 13. Once the elevation and azimuth antennas are servoed into position wherein their antenna beams scan the desired space, the antennas are left in that position.

Figure 3:
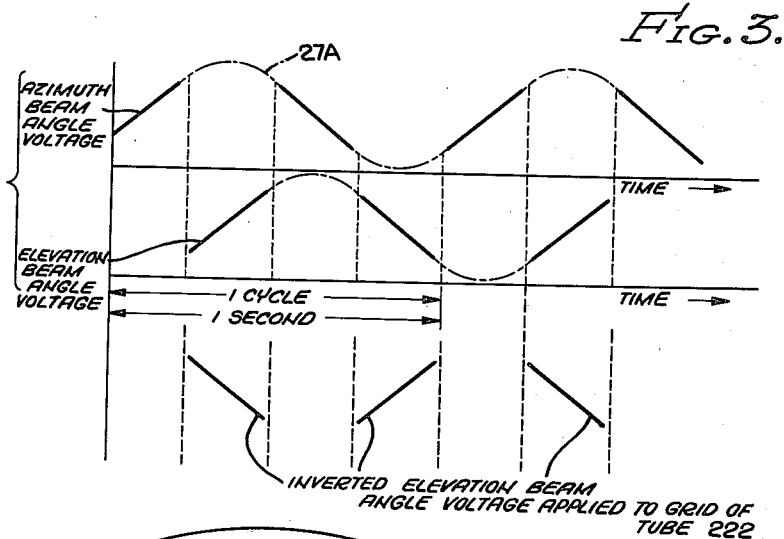
Figure 3 is a graphic representation showing the relationship of the azimuth and elevation antenna beam angle coupling voltages which are developed when and as the antenna beam is being scanned through space.

While in any position during the part of the cycle in which the R. F. switch 6 (Figures 1 and 5) allows the flow of radio frequency energy to the elevation antenna 7 the elevation antenna beam is electrically scanned in elevation. Position of the elevation antenna beam angle is measured by means of a variable capacitor 29, one plate of which is attached to the beam scanner of elevation antenna 7 and varied in accordance therewith, such capacitor 29 comprising one part of a capacitative potentiometer contained in the angle coupling unit 26, which may be of the type described in the copending patent application of George B. Crane, Serial No. 212,114, filed February 21, 1951. The angle coupler 28, when used with angle capacitor 27 generates a voltage 27A as shown in Figure 3 upon scanning movement of the antenna beam and of instantaneous value proportional to the elevation angle of the elevation antenna beam. Angle in azimuth of the azimuth antenna beam is measured by the angle capacitor 30 in azimuth angle coupling unit 31, operating synchronously with the scanner of azimuth antenna 8. After transmission through the cable 36A (Figure 1) from the antenna beam angle remoting assembly to the integrator assembly 37, the signal is reconverted to elevation angle voltage and azimuth angle voltage, as shown in heavy lines in Figure 3.

Figure 5A:
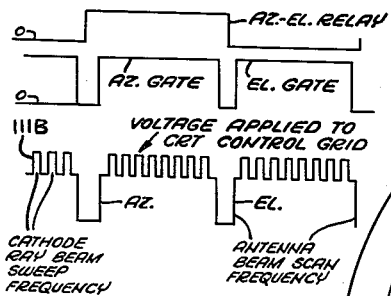
Figure 5A is a schematic representation for purposes of illustrating the time sequence of the elevation blanking gate, the azimuth blanking gate, and the Az—El relay gate.

Also coupled to the scanner of the elevation antenna 7 is elevation blanker switch 94A which generates an elevation blanking voltage or gate so timed that its positive value corresponds to the time of effective scanning of the elevation antenna. The blanker switch 94E is similarly coupled to the scanner of azimuth antenna 8 and generates an azimuth blanking voltage which is so timed that its positive portion corresponds to the time of effective scanning of the azimuth antenna. Relay switch 94F, operated substantially the same time as switch 94E and synchronously therewith, serves to generate an Az—El relay voltage or gate which is so timed that its positive portion begins at a time just prior to the beginning of the azimuth blanking voltage and just after the ending of elevation blanking and which ends at a time just after the ending of the azimuth blanking and just prior to the beginning of the elevation blanking, as seen in Figure 5A.

The radar echo return, when received at the elevation antenna 7 or the azimuth antenna 8, is fed back through the R. F. switch 6 and passed through the tune-receive switch 5 into the receiver 9. From the receiver is taken the video signal.

All the signals, i. e., triggering voltage, elevation angle voltage, azimuth angle voltage, elevation blanking voltage, elevation servo data, video, azimuth blanking voltage, Az—El relay gate and azimuth servo data are variously transmitted to the remote site of the cathode ray tube indicators and their associated components. At this remote site the display appears on an indicator 22 whose maximum range of display is 3 miles and on a second indicator 23 whose maximum range of display is 10 miles. These are described hereinafter as "3-mile cathode ray tube" and "10-mile cathode ray tube," respectively. Associated with the operation of the 3-mile cathode ray tube 22 and the 10-mile cathode ray tube 23 are a range mark generator 41 and a sweep limiter 40 which jointly serve both the 3-mile cathode ray tube 22 and the 10-mile cathode ray tube 23. A 3-mile sweep amplifier 22C and a video amplifier 20 in addition serve the 3-mile cathode ray tube 22. A 10-mile sweep amplifier 23C and a video amplifier 21 in addition serve the 10-mile cathode ray tube 23.

The general function of the sweep amplifier 22C is to provide deflection voltages across the magnetic deflection coils 22A, 22B of the cathode ray tube beam in the 3-mile cathode ray tube 22. Also generated in the sweep amplifier 22C are a cathode ray sweep intensifying gate which is described later and a V-follower signal for the purpose of showing elevation position of the azimuth antenna beam in the elevation display and azimuth position of the elevation antenna beams in the azimuth display. 3-mile sweep amplifier 22C also generates a sweep limiter trigger, as well as an azimuth 300-volt gate and an elevation 300-volt gate for use by the sweep limiter 40. Similar functions are provided for the 10-mile cathode ray tube 23 by the 10-mile sweep amplifier 23C which is not required to provide other signals to the sweep limiter 40.

The function of the video amplifier 20 is to apply to the 3-mile cathode ray tube 22 the range marks generated by the range mark generator 41, the V-follower data and cathode ray sweep intensity gates generated by the 3-mile sweep amplifier 22C, as well as the video detected in the receiver 9 and the pattern shaping voltages received from the sweep limiter 40. The video amplifier 20 modulates the 3-mile cathode ray tube 22 by means of signals applied to its cathode, its grid and its first anode. Similar functions in relation to the 10-mile cathode ray tube 23 are provided by video amplifier 21.

Figure 2:
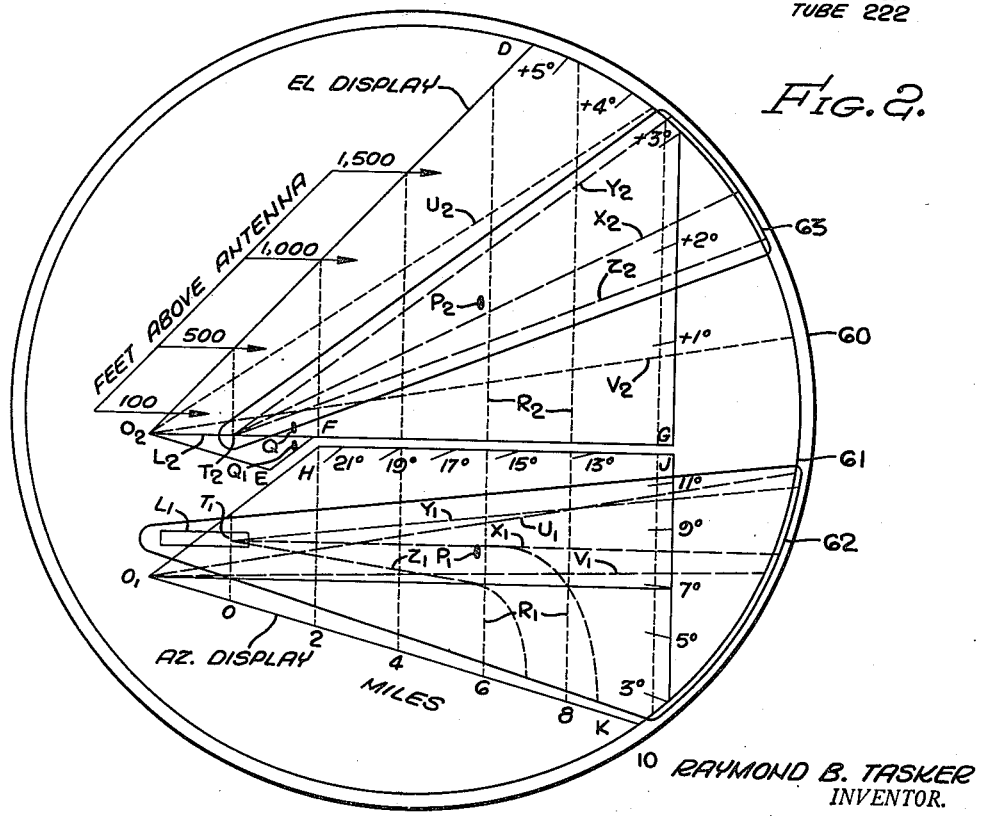
Figure 2 is a diagram of the combined azimuth and elevation displays produced in accordance with the present invention, using novel means for that purpose, and such figure includes the associated maps and flight tabs.

Each cathode ray tube 22, 23 has two sets of magnetic deflection coils 22A, 22B and 23A, 23B, so arranged as to deflect the associated electron beam respectively parallel to two mutually perpendicular axes, the so-called "time base" axis which is generally, although not exactly, horizontal as viewed by the operator, and as shown in Figure 2, and the so-called "expansion" axis, which is generally vertical. For purposes of simplicity, the deflection circuits associated with the tube 23 are described, since the deflection circuits for the two tubes 22, 23 are substantially the same, but of course adapted to receive sawtooth deflecting voltages having different rise rates. Each basic trigger pulse developed in synchronizer 1 is made to initiate a current wave of sawtooth form through the time base deflection coil 23A, and a current wave of similar form through the associated expansion deflection coil 23B, the current in each coil increasing approximately linearly with time, and then returning rapidly to zero. The repetition rate of such sawtooth currents is, of course, the same as the pulse repetition rate of the transmitted pulses and occurs during the expectant period of the echo signals. It will be understood that electrostatic deflection of the cathode ray beam can be used instead of electromagnetic deflection, appropriate modifications being made in other parts of the equipment. For clarity of explanation, and without intending to limit the scope of my invention, its use throughout is described in connection with the electromagnetic type of tube only. Such sawtooth currents applied to the deflection coils, however, are "modulated" at a slow rate by currents of much lower periodicity which are produced by voltages, i. e., the aforementioned beam angle coupling voltages, which are produced in accordance with the scanning movement of the antenna beam and are shown in heavy lines in Figure 3.

Those portions of the voltages indicated in heavy lines only are used to modulate the sweep voltages, on a time sharing basis.

These voltages may vary from plus 2 volts at one extreme of the scanning range to plus 52 volts at the other end. These angle coupling voltages, as mentioned previously, are used in effect to "modulate" the amplitude of the sawtooth voltage waves developed in sweep amplifier 23C and applied at a much higher repetition rate to the vertical deflection coil 23B. On the other hand, the amplitude of the sawtooth voltage waves developed in the sweep amplifier 23C and applied to the other quadraturely acting coil 23A is maintained essentially constant, although it is likewise modulated to a much smaller degree and in a different manner for purposes of orientation as described later. Thus, the amplitude of the current supplied to coil 23B is automatically varied in accordance with the angle coupling voltage, so that the angle which any particular cathode ray beam sweep makes with the time base axis corresponds, on an expanded scale, to the antenna beam angle. This correspondence is independent of the rate of beam angle scan and is maintained regardless of the direction of scan.

Under conditions described more fully later, the tube 22 is rendered fully operative for producing visible indications only when a suitable intensifying voltage is applied to its grid, bringing the tube approximately to cut-off condition. A relatively small additional video signal, whether as a positive voltage pulse applied to the grid or a negative voltage pulse applied to the cathode, then strengthens the cathode beam, making it momentarily visible on the screen as a dot or line whose position is determined by the currents flowing at the moment in the two sets of deflection coils. The intensifying voltage applied to the grid includes two components, namely, a voltage having a duration substantially equal to the duration of a cathode ray sweep, and second, a voltage having a duration substantially equal to the time required for a complete outward or inward antenna beam scan, as the case may be, such time being indicated in Figure 3 as being in the order of one-fourth of a second. Such intensifying voltage is indicated in Figure 5A. By this means spurious signals are prevented from appearing on the screen during the intervals between successive sweeps or during the interval between antenna beam scans by absence of a sufficient grid intensifying voltage.

Thus, during each antenna beam scan, each basic trigger pulse developed in the synchronizer 1 initiates a radiated wave pulse from one of the antennas and also initiates an outward sweep of the associated cathode ray beam from its adjusted electrical center. The video signal reflected from the target in the form of an echo signal is picked up by the corresponding antenna at a time, measured from the occurrence of such trigger pulse, proportional to the target range. During this time the cathode beam moves a corresponding distance along its sweep path. Therefore, the bright spot on the screen produced by the amplified video signal appears at a definite position along the sweep path corresponding to the target range and angle. By indicating on corresponding representations the selected flight path or predetermined safe aircraft glide path by means of a "flight tab," the position of the aircraft with respect to the desired flight path in both azimuth and elevation may be read directly. It should be borne in mind that the cathode ray beam, although it is swept outwardly by current periodically applied to the coils 23A, 23B, is rendered invisible at selected times by voltages developed in the sweep limiter 40 and applied to the first anode 41 to obtain pattern clipping, in the manner described later. It should be noted that the voltage on such first anode is normally sufficient to allow the cathode ray beam to become visible, but to obtain pattern clipping in the manner described herein, a negative blanking voltage is applied at controlled times to such first anode.

To facilitate reading from the representation the aircraft range, it is usual to provide electronically produced range marks. The range marks are usually applied like the video from the echo signals by means of negative going intensifying pulses applied to the cathode of the indicator tube. Very brief pulses are produced by special circuits in the range mark generator 41 at a series of definite times following each basic trigger supplied from synchronizer 1, the times being chosen to correspond to any desired specific range. Since the time base sweep, as so far described, is uniform and is produced independently of the angle coupling voltage, the range marks thus produced are substantially straight lines at right angles to the time base axis. However, it is desirable to "modulate" the amplitude of the sweep currents applied to the time base coil 22A in small degree with angle coupling voltage, but even so, in such case, although the rate of sweep of the electron beam parallel to the time base axis changes, the position of the range marks, controlled entirely by a time relation, moves correspondingly, and thus continue to represent the target range correctly. Typical range marks are represented in Figure 2 by the lines R.

For ease of reading the scope pattern, the range marks are made perpendicular to the runway axis. This is accomplished by amplitude modulating the sawtooth current through the time base (horizontal) deflection coil 23A with angle coupling voltages, the amplitude of the current decreasing slightly with increasing antenna beam angle. This has the effect of tilting the range marks to the left as seen on the screen. The degree of modulation is adjusted till the range marks are perpendicular to the runway axis on the map to thereby effectively move the antenna to a position on the runway axis from the position it actually occupies adjacent the runway axis where such antenna does not interfere with flight of the aircraft.

In Figure 2, a display or representation of both azimuth and elevation information is shown. The vertical dotted lines represent the range marks (actually continuous) produced by the cathode ray beam; the light solid lines are the maps, drawn on a single transparent sheet 61 superposed (optically or mechanically) on the face of the tube; and the dashed lines are drawn on the azimuth and elevation flight tabs 62 and 63, also transparent superposed sheets, one adjustable to pass through any desired touchdown point $T_1$ of the azimuth display at any desired angle, and the other through the corresponding point $T_2$ of the elevation display at any desired angle. The bright spots at $P_1$ in the azimuth display and at $P_2$ in the elevation display indicate an approaching aircraft which is a little above and to the right (as seen from the runway) of the predetermined glide path $X_1$ and $X_2$. In both displays the axis of the runway ($L_1$ and $L_2$) appears horizontal. The lines $U_1$, $V_1$ in the azimuth display and the lines $U_2$, $V_2$ in the elevation display, shown in dotted lines are so-called V-follower lines, the production and use of which need not be explained here.

It is observed that the azimuth display is directly below the elevation display, the range marks $R_1$ of one appearing as continuations of the range marks $R_2$ of the other. This is a great convenience to the operator and tends to prevent any possibility of confusion, particularly when a number of aircraft are approaching the runway at the same time. Because of the continuity of the range marks, the azimuth $P_1$ of the aircraft is always directly below the elevation image $P_2$ of the same aircraft. This facilitates the identification of the two corresponding images from among a large number which may be visible. Also, if the azimuth image is partially obscured by the presence of ground reflections, it can be distinguished from the background more readily by reference to the elevation display, which is less subject to such disturbances.

Each display is generated as before by repeated sweeps of the cathode ray beam from the zero point $O_1$ or $O_2$, as the case may be, at a gradually varying angle which corresponds on an expanded scale to the momentary antenna beam angle. Following the variations in angle coupling voltages shown in Figure 2 which modulate the sweep voltages occurring at the repetition rate of the system, as described above, one display is presented completely, the angle varying clockwise; then the other display is similarly presented with the angle varying clockwise; then the first display is presented in the opposite sense, the angle varying counterclockwise, and the second display is finally presented counterclockwise. A complete cycle of the antenna mechanism and associated circuit switching therebefore produces two complete scans of each picture.

Figure 4:
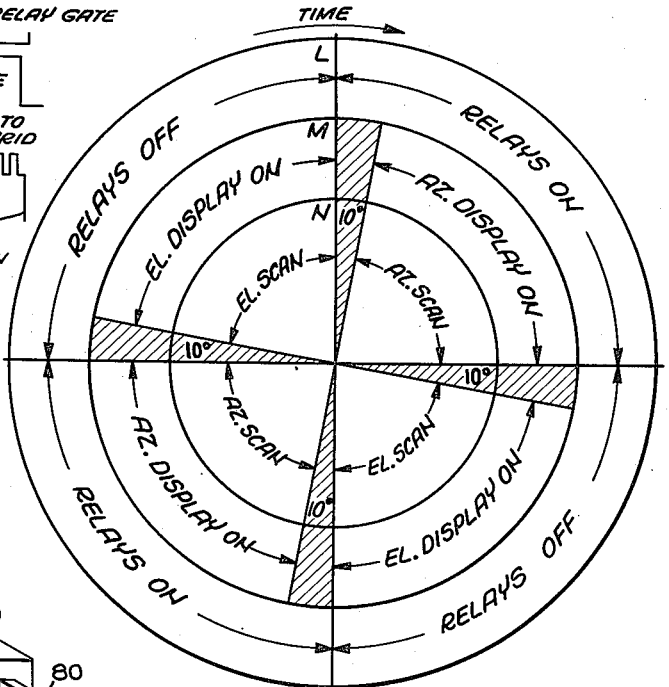
Figure 4 is a cycle diagram illustrating the time course of scanning and switching operations.

Figure 4 shows a schematic diagram of the time relations involved in such a scanning cycle, which typically occupies a time in the order of one second. Forward progress of time is represented by clockwise motion about this diagram. The central circular region of Figure 4, marked N, shows the time schedule of the scanning operations of the two systems. Opposite quadrants represent complete scans by the same system, but carried out in opposite directions. The shaded areas (each comprising roughly 10° of the complete 360° cycle) represent the periods during which the transmitter 4 is switched by the switch 6 in Figure 5 from one antenna to the other. Unshaded areas of region N represent the time periods during which one or the other of the antennas is in use, sending out radio frequency pulses and receiving reflected echo signals from objects within the field of coverage of the beam. Shaded areas indicate inactive periods, during which switching takes place, both antennas being momentarily isolated from the transmitter and receiver.

The inner annular region M of Figure 4 represents the time schedule of the related azimuth and elevation displays, subject however to pattern clipping described later, and corresponds to the cyclical variation of Az and El voltages represented in Figure 5A and applied to the control grid of the cathode ray tube, using the switches 94A and 94E (Figure 5) for that purpose. Unshaded areas represent parts of the cycle during which this grid voltage is applied, shaded areas periods when this grid voltage is cut off, making the tube inoperative.

The outer annular region of Figure 4, marked L, shows the time schedule of current through the solenoids of a number of switching relays for effecting time sharing. The relay actuating current can be obtained, for example, from a cam actuated switch 94F (Figure 5) operated in synchronism with the antenna scanning mechanism.

Figure 5:
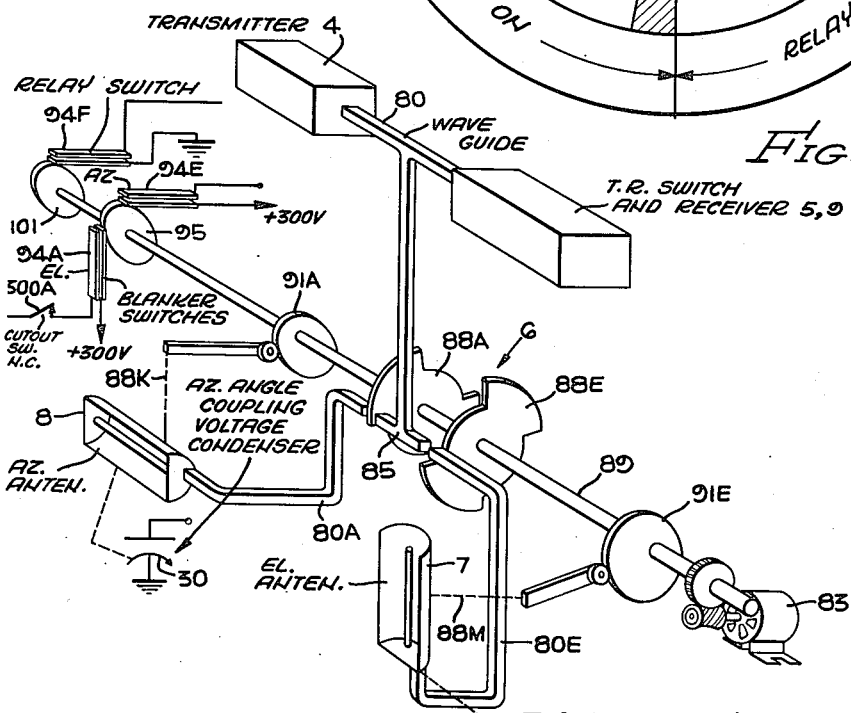
Figure 5 is a schematic perspective of azimuth and elevation antennas showing some of the associated equipment, partly in structural and partly in schematic form.

The switching mechanism will be clear from Figure 5, which is a perspective sketch, partly schematic, showing transmission line switches and also other elements of the switching system described above. All these elements are positively driven from a single shaft 89, one rotation of which corresponds to one complete cycle shown in Figure 4. Each element on the shaft is preferably independently adjustable about the shaft axis, so that the relative timing of the various elements can be accurately established in accordance with Figure 4.

The wave guide transmission line 80 leads from the transmitter 4 and receiving system 5, 9. A T-joint 85 divides this transmission line into two branches 80A and 80E, leading through switch assembly 6 to the azimuth and elevation antenna assemblies 8 and 7, respectively. These branches have suitably placed shutter slots which receive the rotating shutters 88A and 88E, respectively. These are mounted on the common drive shaft 89, driven by motor 83, and have two blades each, arranged in opposite phase, so that when one antenna transmission branch is open the other will be blocked by its shutter. The shutter blades cover angles of approximately 100°, leaving openings of 80°, as required by region N of Figure 4.

The same drive shaft 89 operates the two antenna beam scan mechanisms, represented by the dotted lines 88K and 88M and assumed to be of the construction shown in the above mentioned Allebach application and built into the antenna assemblies. In the showing of Figure 5 the eccentric cams 91A and 91E on shaft 89 operate the beam scan mechanisms.

Since each of cams 91A and 91E has one lobe, while its associated shutter 88A or 88E has two, one opening in the shutter will find the antenna scanning in one direction, the other in the other direction.

The azimuth and elevation blanker switches 94E and 94A are shown schematically in Figure 5 as cam actuated, being operated by the two-lobed cam 95, for purposes of establishing the gating voltages represented in Figure 5A.

The Az—El relay switch 94F is operated by cam 101 on shaft 89 to control current to the circuit switching relays already referred to. The functions of the relay switches operated by switch 94F as described above is indicated in Figure 6, which is a functional diagram showing some of the circuits controlled by this switch and in greater detail some of the components shown in Figure 1.

As illustrated, three separate so-called Az—El relays K1101, K1102, and K1104 are used, each having two double throw switches $m$ and $n$, with the exception of relay K1104 which has only switch $n$. The coils of all three relays are connected in parallel between a source of positive voltage and switch 94F, which leads to ground.

The switch $n$ of relay K1104 serves to connect the positive plate supply voltage alternately to the azimuth and elevation switch tubes in the pattern clipping circuit as described below.

Figure 6:
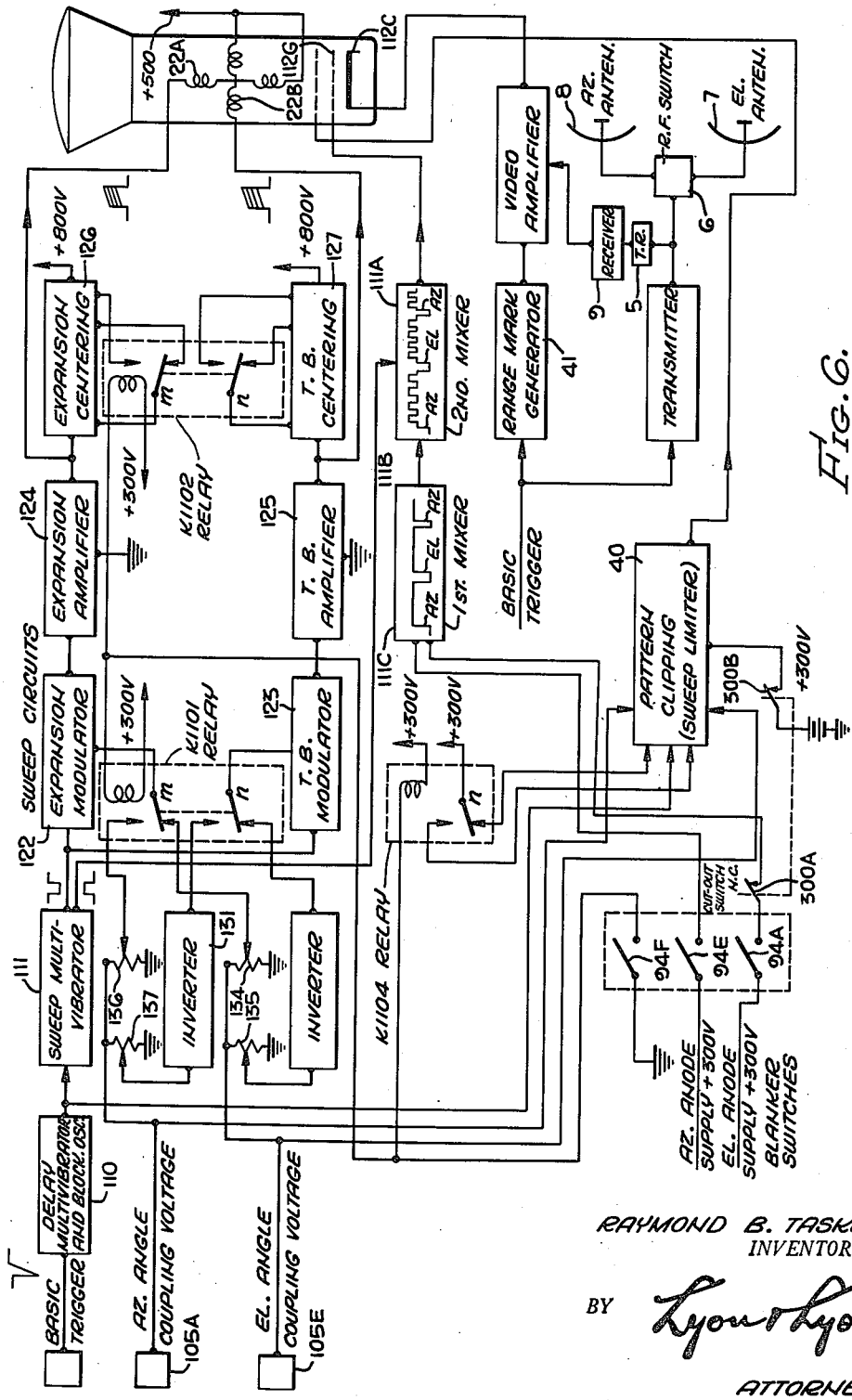
Figure 6 is a block diagram of the circuits associated with the indicator tube for presenting a combination azimuth and elevation display.

The sweep circuits, shown in the upper part of Figure 6, receive impulses as before from the basic trigger, generated in synchronizer 1. The trigger is fed through the delay multivibrator and blocking oscillator stage 110 to the sweep multivibrator 111. This generates a gate which is fed to the second mixer stage 111A to produce the wave form 111B shown both in Figures 6 and 5A. This wave 111B comprises pulses of sweep frequency added to the longer Az and El gates developed in the first mixer 111C. This composite wave 111B is applied to the C. R. T. grid 112G, bringing the tube up to the point of cutoff during each sweep. A negative gate is also generated in sweep multivibrator 111 and fed to the expansion and time base modulators 122 and 123, and from them through the expansion and time base amplifiers 124 and 125 and is applied as essentially trapezoidal waves of appropriate amplitude to the expansion deflection coils 22B and the time base deflection coils 22A, respectively, causing current pulses of linear sawtooth form in the coils. Expansion and time base centering circuits 126 and 127 (see below) are also connected to the deflection coils. The modulators 122 and 123 receive angle coupling voltages via switches $m$ and $n$, respectively, of relay K1101. With the relay unactuated (as shown) the elevation coupling voltage from 105E is connected through potentiometer 134 and switch $m$ to the expansion modulator 122; and through potentiometer 135 and inverter 130 and switch $n$ to the time base modulator 123. After completion of the elevation scan, relay K1101 is actuated by switch 100, breaking the elevation angle voltage connections just described, and connecting the azimuth angle voltage from 105A through potentiometer 136 and switch $m$ to the expansion modulator; and through potentiometer 137, inverter 131 and switch $n$ to the time base modulator.

The potentiometers 134, 135, 136 and 137 control the amplitudes of the coupling voltages supplied directly to the expansion modulator and supplied indirectly through the inverters to the time base modulator. Thus the degree of modulation of the expansion sweep current, and hence the degree of angle expansion of the display, can be separately regulated for the azimuth display by adjustment of the potentiometer 136 and for the elevation display by adjustment of potentiometer 134; and the degree of modulation of the time base sweep current, and hence the apparent angle between the range marks and the time base $O_1K$ or $O_2E$, can be separately regulated for the azimuth display by adjustment of potentiometer 137 and for the elevation display by adjustment of potentiometer 135. The potentiometer adjustments indicated in Figure 6 can be supplemented or replaced by many different types of electronic control means, including the introduction, for example, of a stage of adjustable amplification between the coupling voltage generators 105A and 105E and the switches of relay K1101.

The centering circuits 126 and 127 in Figure 6 are individually capable of two separate adjustments, one effective when relay K1102 is actuated (azimuth display) and one when the relay is unactuated (elevation display). One pair of adjustments determines the position of point $O_1$ in Figure 2 and the other pair determines point $O_2$. Thus the origins of azimuth and elevation displays are separately adjustable, the centering circuits automatically responding to one or other set of adjustments according as relay K1102 is actuated or unactuated.

Figure 7:
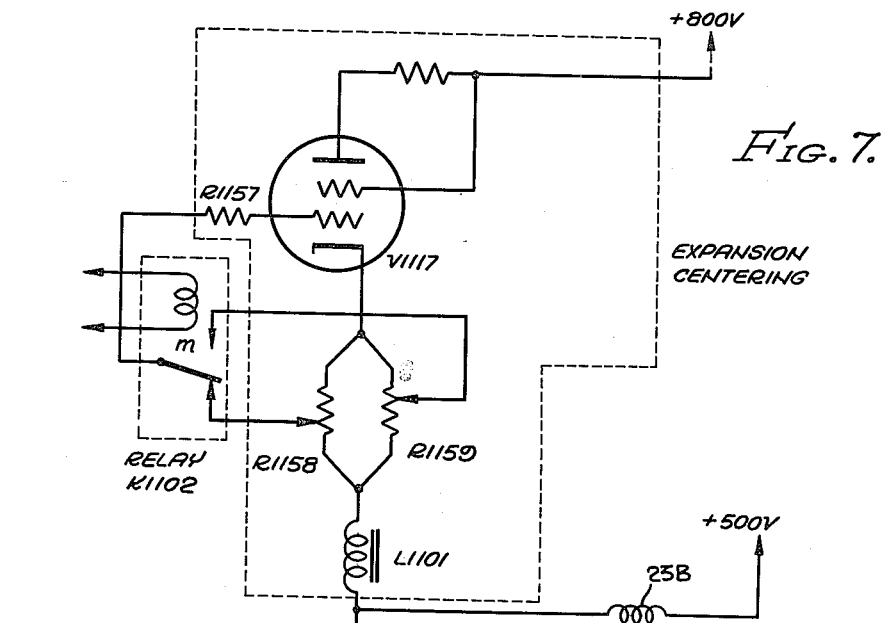
Figure 7 is a schematic circuit diagram illustrating a circuit for establishing the electrical center of the cathode ray tube displays.

A schematic diagram of centering circuitry for the expansion deflection coils is shown in Figures 6 and 7. The deflection coil 23B in Figure 7 is connected between a 500-volt positive supply and two parallel circuits, one leading to ground through tube V1116, which is the final stage of the usual expansion amplifier 124, and the other leading through choke coil L1101 and centering tube V1117 to an 800-volt positive supply. The first of these two circuits feeds to deflection coils 23B the periodically varying sweep producing current component, while the second circuit provides a relatively constant but adjustable centering current component. The cathode resistor of centering tube V1117 is made up of two parallel connected potentiometers R1158 and R1159, the movable contacts of which are connected respectively to the normally closed and normally open contacts of switch $m$ of relay K1102. The switch arm is connected through grid resistor R1157 to the tube grid. The grid bias, and hence the centering current through the tube and through the coil 23B, thus depends upon the position of relay switch $m$, being determined by the setting of potentiometer R1159 when relay K1102 is actuated (azimuth display) and by the setting of potentiometer R1158 when the relay is not actuated (elevation display). The two displays are therefore separately adjustable as to their vertical position (expansion component) on the indicator tube by means of the two potentiometers.

Time base deflection coils 23A are provided with centering circuitry which is similar or identical to that of Figure 7 and functions in a like manner, controlled by switch $n$ of relay K1102. In fact, by appropriate changes of the numerals and lettering, Figure 7 may be considered to illustrate the time base centering circuit. The potentiometers then provide separate adjustments of the azimuth and elevation displays with respect to their horizontal positions (time base component).

Thus, the centering circuits indicated in Figure 6 are separately adjustable for azimuth and elevation displays in both expansion and time base coordinates so as to produce adjustably spaced origins $O_1$ and $O_2$ of the two displays in Figure 5.

It is noted that the preferred interrelationship of the two displays (Figure 2) is such that the pairs of corresponding range marks of the two patterns lie in a single line, so that the two images $P_1$ and $P_2$ always lie in a line which is parallel to the range mark lines, specifically in this case one directly above the other. That relative relationship is due to the fact that the adjustments of the centering voltages and the adjustments of the angle coupling modulations of the time base sweep pulse amplitudes for both displays are such as to make both sets of range marks parallel to the line of relative displacement $O_1O_2$ between the two origins of the displays. The time base sweep amplification (apart from this modulation) is the same for both displays, since the one time base amplifier 125 serves for both displays. Therefore, once the direction of the range marks is thus adjusted, corresponding marks of the two displays will be in a single line.

The azimuth display, which is preferably the lower one, is clipped, by means which include the pattern clipping stage 40, above a horizontal line HJ parallel to the runway axis and at a sufficient distance above it to allow for expected errors in the azimuth angle of approaching aircraft. In practice it is found that a satisfactory interval on the screen between clipping line HJ and the runway axis $X_1$ corresponds to an actual distance of about 2000 feet.

In the elevation (upper) display a section is cut out or clipped, by means which include the pattern clipping stage 40, below horizontal runway axis $O_2G$ and to the right of a short generally vertical line EF. This line is located just to the left of and parallel to the upper limiting sweep path $O_1H$ of the lower azimuth display. The region thus eliminated from the elevation display corresponds to space below the runway level.

The small triangle $O_2EF$ which is retained below this level is well worth preserving, since it insures that an aircraft even at the point of landing $T_2$, will appear well within the lower border of the display. The triangle $O_2EF$ is also useful in adjusting the electronic display, particularly to make that sweep path which corresponds to a horizontal radar beam coincide with the ground line $O_2F$ on map 61. An accurate method of checking this adjustment, either in setting up the equipment or during its regular operation, is to compare the direct radar image Q of some natural or artificial object close to the ground, with the image $Q_1$ of the same object reflected in the ground surface. Under normal conditions correct adjustment is indicated if map line $O_2G$ passes between the two images Q and $Q_1$, and is equidistant from them.

The action of the sweep limiter 40, for purposes of clipping or limiting the cathode ray tube display, is now described in connection with Figures 1, 9 and 8 which includes Figures 8A, 8B and 8C. In general, there is provided a sweep limiting circuit for each one of the three-mile and ten-mile displays.

Assuming that all of the potentiometers in the sweep limiter are properly adjusted, the following is a brief description of the operation of the same, it being noted that a more detailed description of the circuitry thereof follows. The sweep limiter 40 receives as input signals from the 3-mile sweep amplifier 22C, an elevation 300-volt gate, and azimuth 300-volt gate, as well as a triggering voltage, both of such gates, of course, appearing alternately and occurring at a relatively low rate, whereas the repetition rate of the triggering voltages is the same as that of the cathode ray sweeps. It also receives azimuth angle voltage and elevation angle voltage from the antenna beam angle trigger integrator assembly 37, such voltages being a measure of the scanned beam angle of the elevation antenna and of the azimuth antenna. The elevation-300-volt-gate and the azimuth-300-volt-gate are produced by operation of relay K1104 (Figure 6), which in turn is controlled by blanker switch 94F (Figures 5 and 6). Several of these signals are applied to the "Elevation limit circuit," included in dotted lines in Figure 8A. By the control of the "Elevation limit circuit" the limitation of the elevation display may be adjusted. The "Blocking oscillator" type trigger circuit, indicated in dotted lines in Figure 8B, is utilized as a means of timing the pattern limiting voltage of the sweep. The signals from the "Elevation limit circuit" and "Blocking oscillator" are fed in parallel to two channels: one for the limitation of the 3-mile CRT display and the other for the limitation of the 10-mile CRT display. The 3-mile CRT display channel consists of a "Variable gate length multivibrator" indicated as such on Figure 8B, a "Gate control" circuit and a 3-mile CRT "Blanking gate multivibrator." The output of such "Blanking gate multivibrator" is applied directly through the video amplifier 20 without change therein which furnishes signals to the 3-mile tube 22. The 10-mile CRT channel consists of a "Variable gate length multivibrator," the "Gate control" circuit and a 10-mile "Blanking gate multivibrator." The output of the 10-mile blanking gate multivibrator is a blanking gate delivered directly through the video amplifier 21 without change therein which intensifies the 10-mile CRT display.

The elevation-300-volt-gate is delivered to form the gated plate voltage of electron tube 244. The grid of electron tube 244 is energized by means of elevation angle voltage. The function of electron tube 244 is to invert and gate such elevation angle voltage. The inverted and gated elevation angle voltage is then fed to resistance 249 from which a 3-mile-elevation-limit adjust potentiometer 250 derives a voltage for delivery to the 3-mile gate control circuit. Also from the plate circuit of electron tube 244, in a different potential level, an inverted and gated 10-mile elevation angle voltage is applied to resistor 249A from which the "10-mile elevation limit adjust" potentiometer 250A derives the voltage for delivery to the 10-mile gate control circuit. From the cathode of tube 244, gated elevation angle voltage is delivered to the grid of tube 252. The bias of the cathode of tube 252 is adjusted by "Elevation limit stop" potentiometer 253, which functions to limit the value of elevation angle voltage beyond which no pattern clipping will be derived. Signal at the anode of electron tube 252 is delivered to the grid of tube 299 as inverted and limited elevation angle voltage which is used to set the level for the triggering voltage also applied to the same grid. Electron tube 299 functions as an amplifier and the signal appearing at its anode is delivered to the anode of electron tube 299, of a blocked oscillator type trigger generator which is normally in cutoff condition. The signal which is applied to such anode of electron tube 208 is a trigger which operates continuously at the repetition rate of the radar system and in synchronism with it except at such times as during the elevation scan, the elevation angle voltage exceeds the critical value defined by the setting of "Elevation limit stop" potentiometer 253. Either during the time of azimuth scan when electron tube 244 is not energized with plate voltage or during the period of the elevation scan when the elevation angle voltage applied to the grid of tube 244 is less than the cutoff value determined by the cathode bias potentiometer 253, the trigger is applied to electron tube 200 to "fire" the blocking oscillator, the output of which appears across resistances 214 and 215. The amplitude of such triggers is adjusted by means of potentiometer 214 for use with 3-mile CRT sweep limiting and by means of potentiometer 215 for use with the 10-mile CRT sweep limiting. The 3-mile CRT limiting trigger taken from potentiometer 214 is applied to one side of the variable gate length multivibrator, composed of electron tubes 218 and 219 to initiate a flip-flop operation by cutting off the conduction of electron tube 219. The three-mile elevation limit adjust potentiometer 259 has a signal derived from the "Elevation limit circuit" which is applied to the grid of electron tube 222 which is gated on by the elevation-300-volt-gate applied to its anode. The elevation angle voltage, thus inverted and gated, is applied by cathode coupling to electron tube 220. Also cathode coupled to electron tube 220 is electron tube 221. On the grid of tube 221 is applied azimuth angle voltage and on the anode of the same tube is applied the azimuth 300-volt gate. The azimuth angle voltage, so gated, is then cathode coupled to the cathode injector electron tube 220. The cathode bias of electron tube 220 is determined by the combination of potentiometer 239 which is labeled "3-mile azimuth limit adjust #2," and potentiometer 240 which is labeled "3-mile azimuth limit adjust #3." The output of the cathode injector tube 221 alternately consists of elevation and azimuth signals. Potentiometer 291 which is labeled "3-mile azimuth limit adjust #1" serves to adjust the time constant of the associated multivibrator grid circuit. The three potentiometers 291, 239 and 240, labeled respectively "3-mile azimuth limit adjust #1," "3-mile azimuth limit adjust #2" and "3-mile azimuth limit adjust #3" may be variously adjusted so that the change in limiting which occurs with differential change in angle volt may be adjusted for optimum presentation, it being noted that the "Elevation limit stop" potentiometer 253 is adjusted to determine the angle voltage at which clipping begins. The output of the variable gate multivibrator appearing at the anode of tube 219 is thus a positive voltage gate varying in time duration which decreases with increase in azimuth angle voltage, and with decrease in elevation angle voltage, in the azimuth and elevation displays respectively. Such variable length voltage is applied to the differentiating circuit consisting of capacitor 236 and resistor 261 and grid conductance of tube 237, and thus the grid of tube 237 of the CRT blanking gate multivibrator. Tube 237 is normally conducting. The negative pulse derived by the differentiator circuit 236, 261 from the trailing edge of the variable gate voltage applied thereto operates to drive the grid of tube 237 below the point of conduction cutoff. Tyical multivibrator action results in a 650-volt gate of which the beginning is delayed by the length of the variable gating voltage applied thereto. In the case of the azimuth display the delay is variable from 10 to 40 microseconds; in the case of the elevation display the delay is variable from 8 to 10 microseconds. The produced blanking gate is applied via the video amplifier without change therein to the first anode of the 3-mile CRT in the form of a negative pulse. The signal thus delivered to the first anode of the 3-mile CRT functions to obliterate from the 3-mile CRT display the remainder of each sweep trace occurring after the delay introduced by the variable gate length multivibrator.

One of the features of the present invention resides in the fact that, if desired, an unlimited display of the azimuth presentation may be produced. This is accomplished by actuating the switch 300 which includes a normally closed section 300A and a normally closed section 300B. The switch 300A, a cutout switch, is in series with the El blanking switch 94A so as to prevent the transfer of the El portion of the wave shown in Figure 5A to the control grid of the CRT whereby such tube remains dark, i. e., cut off, during the El antenna beam scanning. On the other hand, opening of switch 300B interrupts the supply of anode voltage to tube 219A in the 10-mile variable gate length multivibrator, thereby preventing its operation and hence preventing limiting of the azimuth presentation.

The following is a more detailed description of the sweep limiter 40.

In Figures 8 and 9 it is observed that the gated amplifier tube 200 is supplied with triggering voltages from the sweep amplifier and is coupled to a blocking oscillator stage 208 which serves as an isolation stage. The output of this blocking oscillator stage is transferred both to the 3-mile and 10-mile circuits, but in the block diagram in Figure 9, for purposes of simplicity, it is shown as being supplied only to the 3-mile circuit which includes a timing multivibrator stage 218, 219 and a blanking multivibrator 237, 262.

In general, the trigger applied to the gated amplifier 200 initiates a gating voltage 300 of a length which is variable and dependent upon the magnitude of the negative gating voltage supplied to the timing multivibrator 218, 219 through the modulation amplifier 220. The output of the timing multivibrator 218, 219 is supplied to the blanking mutilvibrator 237, 262 which serves to change the polarity of the pulse, for purposes of applying the same 301 to the first anode of the 3-mile cathode ray tube. Such negative pulse 301 is of substantially constant width, but displaced variable amounts along the time axis, corresponding to the trailing edge of the positive pulse supplied thereto, and such negative pulse 301, while in existence, serves to blank the cathode ray tube, i. e., to darken the same.

For purposes of obtaining the variable gate 300, azimuth angle coupling volts or inverted elevation coupling volts, as the case may be, are transferred to the modulation amplifier 220, which serves to generate the negative gating voltage 302, such negative gating voltage 302 serving to terminate the positive gating voltage 300 generated in the timing multivibrator 218, 219.

The specific circuit for accomplishing this general purpose is described in relationship to Figure 8. Triggering pulses applied from the sweep amplifier 22C are transferred through condenser C-6501 to the control grid of the gated amplifier tube 200. The cathode of tube 200 is connected to ground through the bias resistance and condenser combination 201, 202. The anode of tube 200 is supplied with space current from the positive lead 205, such space current flowing through one of the windings 206 of the blocking oscillator transformer 207.

The blocking oscillator tube 208 has its cathode grounded and its control grid returned to ground through the transformer winding 209 and parallel connected resistance and condenser combination 210, 211. The anode of tube 208 is connected to the positive lead 205 through the winding 206.

The output of the blocking oscillator appearing across the winding 212 appears across the potentiometer resistances 214, 215, the movable taps on which respectively serve to supply adjustable potential pulses to the 3-mile and 10-mile channels 216, 217. The 3-mile channel 216 is the only one described in detail since it functions precisely as the 10-mile channel 217, and any differences in operation of the same are mentioned herein.

The timing multivibrator includes the two tubes 218, 219, while the associated gate control circuit for the same for obtaining a variable trailing edge includes the three tubes 220, 221 and 222. The variable tap on resistance 214 is connected through condenser 223 to the control grid of tube 219, such control grid being coupled through the serially connected condensers 224, 225 to the anode of the tube 218, which is of the pentode type and has its cathode grounded. The anode of tube 218 is connected to the positive lead 205 through the serially connected resistances 226, 227. The screen grid is supplied with voltage from a voltage dividing circuit which includes the serially connected resistances 228 and 229, the junction point of which is connected to such screen grid.

Tube 219 is of the pentode type and has its cathode grounded, and the anode of such tube is coupled through the parallel connected condenser 230 and resistance 282 to the control grid of tube 218. It is observed that the grid of tube 218 is connected to the negative lead 231 through the isolating resistance 232. The screen grid of tube 219 is connected to the positive lead 205 through the voltage dropping resistance 233.

The circuit thus far described, including the tubes 218, 219, constitutes a multivibrator for generating square type gating voltages, the duration of which, however, may be controlled by voltages supplied to the control grid of tube 219 from the anode of tube 220. These gating voltages controlled by the tube 220 are transferred from the anode of tube 219 through the serially connected resistances 234, 235 and condenser 236 to the control grid of the tube 237 in the blanking gate multivibrator circuit 237, 262, the connection and functioning of which are described later after the following description of the gate control circuit which includes the tubes 220, 221 and 222.

Only one of the tubes 221, 222 is operative at any one particular moment, i. e., that moment when either the azimuth or elevation antenna is effective to transmit pulses and receive resulting echo signals. Thus, when the azimuth antenna is effective, plate voltage in the form of an azimuth gating voltage is applied to the anode of tube 221; and when the elevation antenna is effective for thus purpose, plate voltage in the form of elevation gating voltage is supplied to the anode of tube 222. The cathodes of tubes 221 and 222 are interconnected and returned to the negative lead 231 through a serial circuit comprising: the fixed resistance 238, adjustable resistance 239, adjustable resistance 240 and fixed resistances 241, 242 and 243.

Azimuth and elevation angle coupling voltages are applied to the control grids of the tubes 221, 222 simultaneously with application of gating voltages to their corresponding anodes, but the elevation angle coupling voltage applied to the control grid of tube 222 is first inverted, in a manner described in detail hereinafter, the inverter tube 244 being connected for that purpose. The voltage thus appearing on the cathode of either tube 221, 222, as the case may be, appears between the control grid and cathode of the tube 220, since such control grid is returned to ground through the resistance 289. The anode of tube 220 is connected, for the flow of space current, through resistance 290 to the positive 450-volt lead 277. The voltages thus developed on the anode of tube 220 are transferred to the control grid of tube 219 through serially connected adjustable resistance 291 and fixed resistance 292, so that the operation of tube 219 is effected by the application to its control grid of, first triggering pulses supplied thereto from resistance 214, and second, by voltages in the form represented by the wave form 293 supplied thereto from the anode of tube 220.

More specifically, azimuth angle coupling voltages are applied to the control grid of tube 221 directly from the antenna beam angle integrating assembly 37, through the resistance 245. On the other hand, the elevation angle coupling voltages appearing at the output of the assembly 37 are transferred through the resistance 246 to the control grid of tube 244, which serves essentially as an inverter tube for inverting the elevation angle coupling voltage and which also serves another purpose as described presently.

Tube 244 has its cathode returned to ground through resistance 248, while the anode of tube 244 is connected in the same manner as the anode of tube 222, i. e., to receive the positive elevation gating voltage, whereby space current flows through the tube 244 only during the time that the elevation antenna is effective to transmit pulses and receive resulting echo signals. The elevation angle coupling voltages thus appearing in amplified and inverted form on the anode of tube 244 are transferred to the control grid of tube 222 through the series circuit which includes the fixed resistances 288, 249, adjustable tap on the potentiometer type resistance 250 and resistance 310. It is noted that one terminal of resistance 250 is connected to resistance 249, and the other one of its terminals is connected to ground through the fixed resistance 251. The resistances 249, 250 and 251 thus effectively provide a voltage dividing circuit from which adjusted amounts of elevation angle coupling voltages, in inverted form, may be obtained and applied to the control grid of tube 222.

It is observed that the cathode of inverter tube 244 is connected to the control grid of the second inverter tube 252, so that the uninverted elevation angle coupling voltage which appears across the resistance 248 is transferred between the control grid and cathode of tube 252. The cathode of tube 252 is connected to the movable tap on the resistance 253, which forms a portion of a voltage dividing circuit, such voltage dividing circuit being connected between the positive 300-volt lead 205 and ground and comprising the resistances 254, 255 and resistance 253. It is observed that the movable tap on resistance 253 is at a positive potential and thus normally serves to bias the control grid of tube 252 in a negative direction.

The elevation angle coupling voltage thus transferred to the control grid of tube 252 appears in inverted and amplified form on its anode, and such inverted voltage is applied through resistance 256 to the control grid of the amplifier tube 200. The tube 252 is supplied with space current which flows to the anode of tube 252 from the positive lead 205 and through resistance 257. It is noted that the control grid of tube 200 is normally, in its quiescent state, biased at a relatively high negative potential, inasmuch as such control grid is connected through resistance 258 to the negative lead 260.

As mentioned previously, the positive gating voltages developed on the anode of tube 219 are transferred from such anode to the blanking gate multivibrator, the function of which is generally to provide an amplified gating voltage of opposite polarity, i. e., a negative polarity, for application to the first anode of the cathode ray tube for purposes of blanking the tube while such gating voltage is present. Specifically, the blanking gate multivibrator tube 237 has its control grid coupled to the variable gate length multivibrator through coupling condenser 236, and such control grid is returned to its associated grounded cathode through the resistance 261. Such control grid is also coupled to the anode of tube 262 through condenser 263.

The anode of tube 237 is connected to the positive 750-volt lead 280 for the flow of space current through serially connected resistances 265, 266. Likewise, the anode of tube 262 is connected to the same positive lead 280 through serially connected resistances 267, 268. The resulting varying voltages appearing on the anode of tube 237 are transferred back to the control grid of tube 262 after amplification in the tube 269, which has its control grid coupled to such anode through condenser 270. The cathode of tube 269 is grounded and the control grid is returned to ground through the serially connected resistances 271, 272, the junction point of which is connected to the negative lead 231 through resistance 273. The anode of tube 269 is connected to the cathode of tube 262, so that in effect the tubes 262 and 269 are connected in cascade for flow of space current. It should be observed, however, that the anode of tube 269 is connected to the positive 450-volt lead 277 through resistance 274. Such lead 277 is connected to the cathode of tube 237 and also to the control grid of tube 262 through serially connected resistances 275, 276, the junction point of which is returned to ground through resistance 278.

The multivibrator stage thus described serves to convert incoming positive voltages to negative gating voltages, the appearance of which depends upon the position of the trailing edge of the incoming positive voltage or gate, such negative gating voltages being applied to the first anode of the cathode ray tube for the purposes described. In general, with reference to the azimuth display, such negative gating voltage appears earlier, the higher the magnitude of the Az angle coupling voltage, to thereby produce shorter visible sweeps when the Az angle coupling voltage is relatively large. In the elevation display, such negative gating voltage appears later, the higher the magnitude of the elevation angle coupling voltage, but of course this is not true with respect to inverted elevation angle voltage since in such case the condition is the same as in the azimuth display.

While the 3-mile sweep limiting channel has been described in detail, it is noted that the 10-mile channel is connected in similar fashion and functions in substantially the same manner, and for that reason corresponding parts in the 10-mile channel have the same reference numerals as corresponding parts in the 3-mile channel but with the letter "A" appended thereto. However, the following differences are noted. While in the 3-mile channel the tube 219 is supplied with space current from the positive lead 205, the corresponding tube 219A in the 10-mile channel is supplied with space current from a separate control circuit 285, which includes the normally closed switch 309B (Figures 6 and 8), opening of which, with opening of the related switch 309A, serves to cause presentation only of the azimuth versus range display on the cathode ray tube without limiting and to prevent presentation of the elevation versus range display. A difference of minor importance is that whereas the resistance 249 is connected to the junction point of resistances 287, 288, the corresponding resistance 249A in the 10-mile channel is connected to the other terminal of resistance 288, which corresponds to the anode of tube 244.

In general, variation of the so-called "elevation limit stop" resistance 253 serves to establish the position of the radial line FG in Figure 2 in the elevation display, while the position of the line EF in the same display is controlled or shifted by adjustment of the so-called "elevation limit adjustment" resistance 250. In the azimuth display the line HJ, which defines the end of radial sweeps, is determined by adjustment of three controls, namely, adjustment of resistances 291, 240 and 239.

The adjustments of these three resistances are joint in nature, one affecting the other, but they may each be adjusted so that the line HJ results. The position of the line HJ with reference to the line FG, in turn, may be established by adjusting the electrical centers O₁ and O₂ of the display by the beam centering means described herein.

In initial adjustment of the apparatus the azimuth display is first patterned and positioned, then the elevation controls are adjusted to properly pattern and position the elevation display with reference to the azimuth display. This is so since, as observed in Figure 9, adjustment of the azimuth display potentiometers 239, 240 and 291 effects the elevation display.

The circuit is so adjusted that elevation angle voltage is used to time modulate the timing multivibrator to form the desired slope of the line EF up to 0° on the elevation display, at which time the tube 252 stops the sweep limiting action by biasing the blocking oscillator stage 208 beyond cutoff to thereby render the same inoperative during the remaining portion of the display which corresponds to positive angles of the cathode ray sweeps in the elevation display.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. In a system of the character described, an azimuth antenna, an elevation antenna, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having a pair of quadraturely acting cathode beam deflecting means, two position beam centering means alternately effective to move the cathode beam to different adjusted center positions, means operated synchronously with said transmitting sweep generating means for energizing said beam deflecting means to produce cathode beam sweeps, means operated synchronously with said coupling means to change from one of said centering means to the other centering means and to alternately and synchronously apply said azimuth and elevation angle voltage to said sweep generating means, to thereby obtain alternate azimuth and elevation displays which are each expanded with reference to the space scanned respectively by said azimuth and elevation antenna beams, said cathode ray tube having an intensity controlling electrode, a single timing multivibrator circuit producing gating voltage pulses in time relationship with triggering of said transmitting means, means alternately coupling said azimuth and elevation angle voltages to said timing multivibrator circuit, said timing multivibrator circuit incorporating means for terminating each gating voltage pulse produced thereby at a time determined by the magnitude of said azimuth or elevation angle voltage, as the case may be, a blanking gate generator coupled to said timing multivibrator circuit and functioning to initiate blanking voltages in accordance with the trailing edge of said gating voltage pulses, and means applying said blanking voltages to said intensity controlling electrode.

2. The arrangement set forth in claim 1 in which means are provided for rendering inoperative said timing multivibrator in accordance with the magnitude of elevation angle voltage.

3. In a system of the character described, an azimuth antenna, an elevation antenna, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having a pair of quadraturely acting cathode beam deflecting means, two position beam centering means alternately effective to move the cathode beam to different adjusted center positions, sweep generating means operated synchronously with said transmitting means for energizing said beam deflecting means to produce cathode beam sweeps, means operated synchronously with said coupling means to change from one of said centering means to the other centering means and to alternately and synchronously apply said azimuth and elevation angle voltage to said sweep generating means, to thereby obtain alternate azimuth and elevation displays which are each expanded with reference to the space scanned respectively by said azimuth and elevation antenna beams, said cathode ray tube having an intensity control electrode, means incorporating said intensity control electrode and operated synchronously with said transmitting means to blank selected portions of each azimuth and elevation display, and means effective to render the last mentioned means ineffective and to produce one of said displays with all portions thereof visible.

4. In a system of the character described, an azimuth antenna, an elevation antenna, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having a pair of quadraturely acting cathode beam deflecting means, two position beam centering means alternately effective to move the cathode beam to different adjusted center positions, sweep generating means operated synchronously with said transmitting means for energizing said beam deflecting means to produce cathode beam sweeps, means operated synchronously with said coupling means to change from one of said centering means to the other centering means and to alternately and synchronously apply said azimuth and elevation angle voltage to said sweep generating means, to thereby obtain alternate azimuth and elevation displays which are each expanded with reference to the space scanned respectively by said azimuth and elevation antenna beams, said cathode ray tube having an intensity controlling electrode, a blocking oscillator circuit coupled to said energizing means and functioning to produce triggering voltage pulses in timed relationship with appearance of said cathode beam sweeps, means rendering said blocking oscillator circuit ineffective in accordance with the magnitude of elevation angle voltage, a timing multivibrator circuit coupled to said blocking oscillator circuit for initiating gating voltage pulses, means coupled to and incorporated in said timing multivibrator circuit for terminating each gating voltage pulse in accordance with the magnitude of said azimuth or elevation angle voltage, as the case may be, a blanking gate generator circuit coupled to said timing multivibrator circuit for initiating blanking gates in accordance with timing of the trailing edge of said gating voltage pulses, and means coupling the output of said blanking gate generator circuit to said intensity controlling electrode.

5. In a system of the character described, an azimuth antenna, an elevation antenna, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having a pair of quadraturely acting cathode beam deflecting means, two position beam centering means alternately effective to move the cathode beam to different adjusted center positions, sweep generating means operated synchronously with said transmitting means of energizing said beam deflecting means to produce cathode beam sweeps, means operated synchronously with said coupling means to change from one of said centering means to the other centering means and to alternately and synchronously apply said azimuth and elevation angle voltage to said sweep generating means, to thereby obtain alternate azimuth and elevation displays which are each expanded with reference to the space scanned respectively by said azimuth and elevation antenna beams, said cathode ray tube having an intensity controlling electrode, means producing blanking gate voltage pulses and coupling the same to said electrode, said blanking gate pulse producing means incorporating a multivibrator circuit functioning to control the duration of each blanking gate pulse, means rendering inoperative said multivibrator circuit in accordance with the magnitude of elevation angle voltage, and means controlling said multivibrator circuit in accordance with the magnitude of azimuth or elevation angle volts, as the case may be.

6. In a system of the character described, a source of triggering voltage pulses each of which appear in timed relationship with cathode ray beam sweeps, means coupled to said source for producing gating voltage pulses each corresponding to said triggering voltage pulses, said last mentioned means including only a single timing multivibrator, a source of azimuth and elevation antenna angle voltage the instantaneous magnitude of which is representative of the angular position of an azimuth and elevation antenna beam respectively, means coupling said angle voltage source to said gating voltage pulse producing means, said gating voltage pulse producing means incorporating means for terminating each gating voltage pulse produced therein in accordance with the magnitude of said antenna angle voltage, a blanking pulse generator circuit coupled to said gating voltage pulse producing means and incorporating means for producing blanking pulses in accordance with the trailing edge of each gating voltage pulse.

7. In a system of the character described, a source of triggering voltage pulses which appear synchronously with cathode ray beam sweeps, a blocking oscillator circuit coupled to said source, a timing multivibrator circuit coupled to said blocking oscillator circuit for initiating gating voltage pulses of variable length, a source of azimuth angle voltage, a source of elevation angle voltage, means coupled to said source of elevation voltage for inverting the elevation voltage to thereby produce inverted elevation angle voltage, a pair of switch tubes alternately effective to couple said azimuth angle voltage and said elevation angle voltage to said timing multivibrator circuit, said timing multivibrator circuit comprising means whereby each of the gating voltage pulses produced thereby is terminated upon a predetermined magnitude of azimuth or inverted elevation voltage applied thereto, a second multivibrator circuit coupled to said timing multivibrator circuit and incorporating means for producing a blanking gate voltage pulse in response to the trailing edge of each of the first mentioned gating voltage pulses, a cathode beam intensity control electrode, and means applying said blanking gating voltage pulse to said electrode.

8. In a system of the character described, an azimuth antenna, an elevation antenna, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning each of said antenna beams in space, means deriving a corresponding azimuth angle voltage and an elevation angle voltage, the instantaneous magnitude of each of which is representative respectively of the position of the azimuth and elevation beams, a cathode ray tube having a pair of quadraturely acting cathode beam deflecting means, two position beam centering means alternately effective to move the cathode beam to different adjusted center positions, sweep generating means operated synchronously with said transmitting means for energizing said beam deflecting means to produce cathode beam sweeps, means operated synchronously with said coupling means to change from one of said centering means to the other centering means and to alternately and synchronously apply said azimuth and elevation angle voltage to said sweep generating means, to thereby obtain alternate azimuth and elevation displays which are each expanded with reference to the space scanned respectively by said azimuth and elevation antenna beams, said cathode ray tube having an intensity control electrode, a blanking volt generator circuit coupled to said control electrode and functioning to apply blanking voltages to the same, said blanking volt generator circuit comprising a single multivibrator circuit operated in timed relationship with initiation of said cathode beam sweeps and producing gating voltage pulses, means for inverting elevation angle voltage to produce inverted angle voltage, means responsive to the amplitude of azimuth angle voltage and inverted elevation voltage for controlling the duration of each of said gating voltage pulses, and means rendering said multivibrator circuit inoperative in accordance with the amplitude of inverted elevation angle voltage.

9. In a system of the character described, an azimuth antenna, an elevation antenna, energy transmitting means periodically triggered at a relatively high rate, means alternately coupling said transmitting means to said azimuth antenna and said elevation antenna at a relatively low rate to produce alternately a plurality of azimuth antenna beams and a plurality of elevation antenna beams, means operating synchronously with said coupling means for scanning said antenna beams in space, means deriving a corresponding azimuth angle voltage and an elevation angle voltage, the instantaneous magnitude of each of which is representative respectively of the position of the azimuth and elevation beams, a cathode ray tube having a pair of quadraturely acting cathode beam deflecting means, two position beam centering means alternately effective to move the cathode beam to different adjusted center positions, sweep generating means operated synchronously with said transmitting means for energizing said beam deflecting means to produce cathode beam sweeps, means operated synchronously with said coupling means to change from one of said centering means to the other centering means and to alternately and synchronously apply said azimuth and elevation angle voltage to said sweep generating means, to thereby obtain alternate azimuth and elevation displays which are each expanded with reference to the space scanned respectively by said azimuth and elevation antenna beams, said cathode ray tube having an intensity control electrode, and sweep blanking means comprising a gating voltage generator coupled to said control electrode for normally supplying blanking voltage pulses to the same, means including only one timing multivibrator responsive to the amplitude of each of said angle voltages for varying the time displacement between the initiation of said blanking voltage pulses with respect to the initiation of said sweeps.

10. In a system of the character described, a source of triggering voltage pulses, each appearing in timed relationship with the production of cathode ray beam sweeps, a single multivibrator circuit coupled to said source and normally effective to initiate gating voltage pulses in accordance with appearance of said triggering voltage pulses, a source of elevation angle voltage the magnitude of which is representative of the position of an associated elevation antenna, a source of azimuth angle voltage the magnitude of which is representative of the position of an associated azimuth antenna, means for inverting said elevation angle voltage to produce inverted elevation angle voltage, means rendering said multivibrator circuit inoperative in accordance with the amplitude of inverted elevation angle voltage, and switchable means for terminating the duration of said gating voltage pulses in accordance with the magnitude of the azimuth and inverted elevation angle voltage.

RAYMOND B. TASKER.

References Cited in the file of this patent
UNITED STATES PATENTS

| Number | Name | Date |
|---|---|---|
| 2,378,604 | Wallace | June 19, 1945 |
| 2,405,231 | Newhouse | Aug. 6, 1946 |
| 2,459,481 | Wolff | Jan. 18, 1949 |
| 2,459,482 | Bond | Jan. 18, 1949 |
| 2,549,641 | Schrader | April 17, 1951 |